TUNNEL DIODE LOGIC CIRCUIT FOR ASYNCHRONOUS SIGNAL OPERATION
Filed Oct. 5, 1960
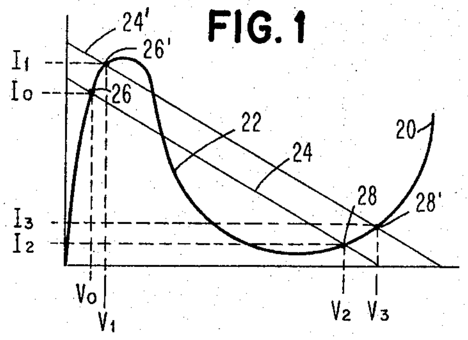
FIG. 1
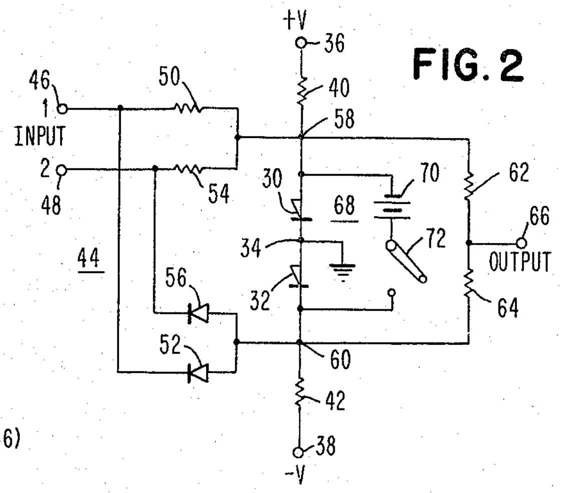
FIG. 2
| (TERM 48) | GND | + | - (TERMINAL 46) |
|---|---|---|---|
| GND | GND | GND | - |
| + | GND | + | - |
| - | - | - | - ← OUTPUT |
FIG. 3
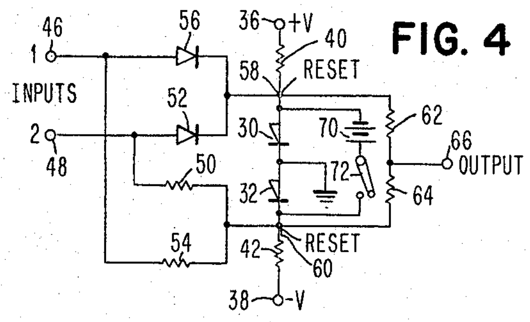
FIG. 4
| (TERM 48) | GND | + | - (TERMINAL 46) |
|---|---|---|---|
| GND | GND | + | GND |
| + | + | + | + |
| - | GND | + | - ← OUTPUT |
FIG. 5
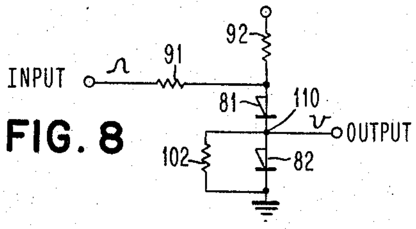
FIG. 8
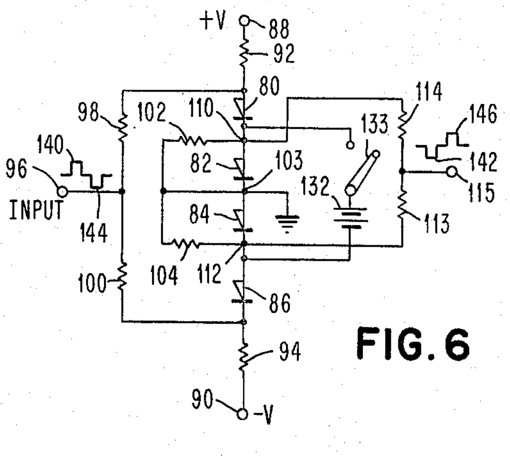
FIG. 6
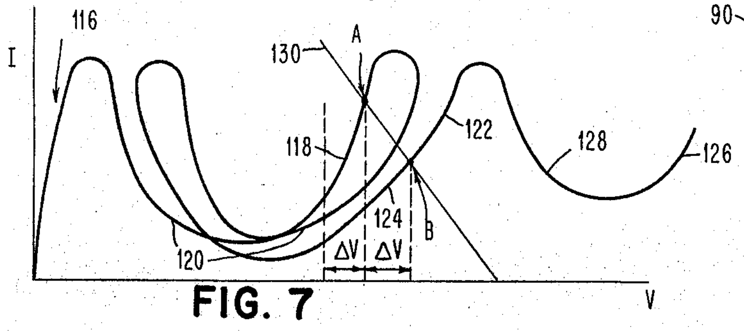
FIG. 7
INVENTOR
ALGIRDAS J. GROUDIS
BY Joseph C. Redmond, Jr.
ATTORNEY 3,265,903

TUNNEL DIODE LOGIC CIRCUIT FOR ASYNCHRONOUS SIGNAL OPERATION

Algirdas J. Gruodis, Hyde Park, N.Y., assignor to International Business Machines Corporation, New York, N.Y., a corporation of New York Filed Oct. 5, 1960, Ser. No. 60,640
12 Claims. (Cl. 307—88.5)

This invention relates to logic circuits and more particularly to logic circuits employing bistable semiconductor devices.

In many instances, information handling and other related apparatus are designed for asynchronous operation in which there is no fixed time reference for the execution of an operation. Instead an operation is commenced as soon as sufficient information is available to perform the operation. To carry out an operation at the proper time, logic circuits employed in asynchronously-operated apparatus are required to process or generate at least three different signals, typically positive, negative and ground signals, these signals hereinafter being referred to as asynchronous signals. It is desirable that such circuits be simple in construction, rapid in operation, and inexpensive in cost. Recently, a bistable semiconductor device has been developed which permits logic circuits to be designed for asynchronously-operated apparatus that fulfill the previously-indicated requirements. Logic circuits employing the new device as the active element thereof should also be conveniently and quickly adaptable to perform a multiplicity of logical functions. Moreover, such circuits should be able to provide proper polarity reversal of the asynchronous signal supplied thereto.

A general object of the present invention is an improved logic circuit which may be readily adapted for a variety of logical functions including polarity reversal of input signals.

One object is a rapid logic circuit for asynchronously-operated apparatus.

Another object is a simplified logic circuit employing bistable semiconductor devices for performing either "AND" or "OR" logic operations with asynchronous signals.

Another object is an inexpensive logic circuit employing bistable semiconductor devices which provides polarity reversal of asynchronous signals about a reference level.

These and other objects are accomplished by the present invention, one illustrative embodiment of which comprises at least one set of bistable semiconductor devices having a common junction that is connected to a reference point. A power supply of suitable magnitude is connected to the set of bistable semiconductor devices to bias each device into the forward conductive direction. An input circuit for receiving asynchronous signals is connected across the set of devices, said input circuit including means for applying the asynchronous signals to preselected bistable devices. Completing the embodiment is an output circuit connected to the devices to provide output signals at the correct instant in the operation of asynchronously-operated apparatus.

One feature of the invention is a set of bistable semiconductor devices biased for selective operation and having an input circuit connected thereto so that output signals are developed which are either "AND" or "OR" combinations of asynchronous signals supplied to the input circuit.

Another feature is a set of bistable semiconductor devices connected in series aiding relation and having the common junction therebetween connected to ground, the set of bistable devices being adapted to switch selectively for either a signal of one polarity or a plurality of signals of like polarity.

Still another feature is a set of bistable semiconductor devices biased so that at any instant each bistable device will be in a different operating state for an input signal supplied thereto and an output signal therefrom will be of a different polarity from that of the input signal.

The foregoing and other objects, features and advantages of the invention will be apparent from the following more particular description of the preferred embodiments of the invention as illustrated in the accompanying drawings, in which:

FIG. 1 is a voltage-current characteristic of one example of a bistable semiconductor device employed in the present invention;

FIG. 2 is an electric schematic of one embodiment of the present invention for performing "AND" logic operations;

FIG. 3 is a table of input and output relations for the circuit of FIG. 2;

FIG. 4 is an electrical schematic of another embodiment of the invention for performing "OR" logic operations;

FIG. 5 is a table of input and output signals for the circuit of FIG. 4;

FIG. 6 is an electrical schematic of another embodiment of the invention which provides polarity reversal of asynchronous signals supplied thereto;

FIG. 7 is a voltage-current characteristic of a set of bistable semiconductor devices employed in FIG. 6; and FIG. 8 is a modification of the embodiment shown in FIG. 6.

An essential element of the invention is a bistable semiconductor diode capable of storing different quantities of energy in either of two stable states. Bistable semiconductor devices are known to exist in several forms to a worker skilled in the art. One eminently satisfactory device that has recently been developed is described in an article entitled "New Phenomenon in Narrow Germanium P-N Junction," Physical Review, vol. 109, 1958, page 603. The device described in the previously mentioned publication is commonly referred to as a tunnel or Esaki diode. The tunnel diode has been selected as a preferred element for use in the invention because of the extreme speed response thereof. It should be understood, however, that other bistable semiconductor devices may be employed in the practice of the invention with satisfactory results.

Referring to FIG. 1, the tunnel diode has a voltage-current characteristic 20 which exhibits a negative resistance region 22. If a load line 24 is assumed as indicated, the diode is capable of stable operation at either point 26 or 28. Points of stable operation also indicate different levels of energy storage. In other words, at point 26 the diode stores an amount of energy which is a function of voltage $V_0$ and $I_0$, and at the point 28, the diodes stores an amount of energy which is a function of $V_2$ and $I_2$. It will be appreciated from FIG. 1 that the characteristic of the diode is such that the switching thereof from one state to the other is not immediately accomplished with simple circuit techniques.

Turning now to FIG. 2, one illustrative embodiment of the present invention performs an "AND" operation for asynchronously-operated apparatus. The embodiment includes two matched tunnel diodes 30 and 32 connected in aiding series relation and having a common junction 34 which is connected to a suitable reference, typically ground. The matched tunnel diodes 30 and 32 are connected to power sources 36 and 38 respectively including resistors 40 and 42, respectively, the former power source being a unidirectional source of positive polarity and the latter source being a unidirectional source of negative polarity. An input circuit 44 including terminals 46 and 48 for receiving signals is connected across the diodes 30 and 32. The input circuit comprises two branches conconnected in parallel, one branch including the terminal 46, a resistor 50 and an asymmetrical semiconductor device 52, typically a PN junction diode. The other branch includes the terminal 48, a resistor 54, and an asymmetrical semiconductor device 56, typically a PN junction diode. Completing the embodiment of the invention shown in FIG. 2 is an output circuit connected across the diodes and to nodes or junctions 58 and 60, the nodes being common points for the input circuit and the power sources. The output circuit includes series resistors 62 and 64 and an output terminal 66 connected to the common junction between the series resistors.

A reset circuit 68 is also connected to the junctions 58 and 60, the purpose of the circuit being to transfer the diodes from the stable operating 28 to the stable operating point 26 (see FIG. 1). The reset circuit may take any one of several forms, a typical circuit including a battery 70 and a switch 72, as shown in FIG. 2. The negative terminal of the battery is connected to the junction 58 whereas the positive terminal is connected through the switch 72 to the junction 60 for reasons more apparent hereinafter.

As defined herein "AND" operation for asynchronous signals provides a positive output signal indicating that the information is complete and that both input signals are positive. A negative output signal indicates that the information is complete and the lack of positive coincidence in the input signals. For example a negative signal will appear if one input is positive and the other negative, or if both inputs are negative, or if one input is a ground signal and the other is a negative signal. A ground output signal occurs when either one input line is positive and the other at ground or both input lines are at ground. In the former instance the ground output signal indicates that sufficient information is not available to perform the operation. In the latter instance the ground output signal indicates that the previous operation has not been completed and the present operation cannot be performed.

To adapt the circuit of FIG. 2 for asychronous "AND" operation, the resistors 54 and 50 of the input circuit and the resistor 40 of the power supply 36 are selected to operate the diode 30 at either the operating point 26 or the point 28 on the load line 24 (see FIG. 1), the diode normally operating at the point 26. The diode is switched from the normal point 26 to the point 28 by applying positive pulses to the input terminals. The magnitude of the pulses is selected so that a positive pulse is required at both input terminals before the diode switches. In contrast, the resistor 42 of the power supply 38 is selected to operate the diode 32 along a load line 24′ (see FIG. 1) having operating points 26′ and 28′, the diode normally operating at the point 26′. The diode is adapted to switch from the normal point 26′ to the point 28′ when a negative pulse appears at either input terminal. After switching, the diodes are adapted to be returned to their normal operating points by the reset circuit.

It will be appreciated from FIG. 1 that the voltage across a diode increases when switched from the operating point 26 or 26′ to the operating point 28 or 28′. In the case of the diode 30, the voltage increase is positive since the anode terminal rises above the cathode terminal which is connected to ground. In contrast the voltage across the diode 32 increases negatively since the cathode terminal falls below the anode terminal which is connected to ground. The voltage appearing at the output terminal with respect to ground is the algebraic sum of the voltages across the diodes 30 and 32, less the drop in the resistors 62 and 64.

The operation of the "AND" circuit will now be described in conjunction with FIGS. 1, 2 and 3, the latter figure indicating the output signals from the circuit for the various combinations of asynchronous signals applied to the input terminals 46 and 48. Operation of the circuit commences with the diodes 30 and 32 in the normal operating states 26 and 26′, respectively.

For a ground signal at both input terminals neither diode switches to the high voltage state to provide an output signal. If one input signal is a ground signal and the other a positive signal neither diode will switch to the high voltage state to provide an output signal. A negative and ground signal, however, will switch the diode 32 to the high voltage state and a negative signal will appear at the output terminal. The negative output signal is believed to be apparent since the voltage across the diode 32 increases negative as previously explained. The negative voltage across the diode is larger than the positive voltage across the diode 30 which remains in the normal operating condition. Hence the algebraic combination of voltages across the diodes is negative and the output signal is negative.

In the case of like positive signals to both input circuits, the diode 30 switches to the high voltage state and a positive signal appears at the output terminal. The voltage across the diode 30 is positive, and larger than the voltage across the diode 32 which remains in the normal operating condition. Hence, the algebraic combination of voltages across the diodes is positive and the output signal is positive.

For positive and negative signals to the input circuit only the diode 32 switches, and a negative voltage appears at the output terminal for reasons previously indicated. A pair of negative signals to the input circuit will also switch the diode 32 and produce a negative signal at the output terminal.

The summary of output signals for the various combinations of input signals is shown in FIG. 3.

The reset circuit returns an operated diode to the normal operating condition upon closing the switch 72. The battery, when connected to the diodes 30 and 32, reduces the voltage across each diode to return the operated diode to the normal operating condition. Thereafter, the switch 72 is opened after the diodes are reset and the circuit is ready for the next operation. It is believed apparent that the circuit could also be reset by changing the magnitudes of the power supplies 36 and 38.

The circuit of FIG. 2 may be easily adapted to operate as an "OR" circuit for asynchronous input signals. Referring now to FIG. 4 where like elements to those shown in FIG. 2 have the same designation, it will be seen that the input circuit to the "OR" circuit is the reverse of that for the "AND" circuit shown in FIG. 2. For the "OR" circuit the diodes 52 and 56 are connected to the diode 30 and the resistors 50 and 54 are connected to the diode 32 instead of the diodes 52 and 56 being connected to the diode 32 and the resistors to the diode 30 as in the case of the "AND" circuit. Also the diodes 52 and 56 are arranged to supply current to the diode 30 when positive input pulses are supplied to the input terminals 46 and 48 whereas the diodes 52 and 56 of the "AND" circuit were adapted to supply current to the diode 32 when negative input pulses were supplied to the input terminals.

As employed and defined herein, the "OR" circuit for asynchronous signals provides a positive signal when the information is complete and either or both of the input signals are positive. A negative output signal indicates that the information is complete but that neither input signal are positive. A ground output signal indicates that a previous operation has not been completed and the present operation can not be performed.

To adapt the circuit of FIG. 4 for "OR" operation, the diodes 30 and 32 are biased for operation along the load lines 24′ and 24 of FIG. 1. Thus if either or both inputs to the circuit are positive, the diode 30 will switch to the high voltage state and a positive pulse will appear in the output circuit. When both input signals are negative, the diode 32 will switch and a negative pulse will appear in the output circuit indicating the absence of a positive pulse. A ground signal on either input circuit will prevent any output from the circuit except when a positive signal is the other signal applied to the circuit.

In view of the foregoing it is believed that the "OR" circuit operates in a manner similar to that described for the "AND" circuit shown in FIG. 2. Hence further description of the circuit is not believed to be necessary. A summary of the output signals for the various input signals to the "OR" circuit is shown in FIG. 5.

The circuits of FIGS. 2 and 4 may be further modified to perform inverter operation for asynchronous signals. The inverter circuit, shown in FIG. 6, comprises two sets of matched tunnel diodes, one set including diodes 80 and 82 and the other set including diodes 84 and 86. The diodes are connected in aiding series relation between power supplies 88 and 90 which include resistors 92 and 94 respectively. The former power supply is of positive polarity and connected to the diode 80 whereas the latter power supply is of negative polarity and connected to the diode 86. A resistor 102 is connected across the diode 82 to a junction 103 to change the characteristics of the diode 82 with respect to the diode 80. Similarly, a resistor 104 is connected across the diode 84 to the junction 103 to change the characteristic of the diode 84 with respect to the diode 86. The junction 103 which is common to both sets of diodes is connected to a suitable reference point, typically ground.

Completing the inverter circuit of FIG. 6, are an input circuit and an output circuit. The input circuit comprises a terminal 96 connected across the two sets of diodes by means of parallel resistors 98 and 100. The output circuit is connected between the nodes 110 and 112 and includes series resistors 113 and 114 and an output terminal 115 connected to the common junction between the series resistors.

A reset circuit is also connected to the inverter circuit. The reset circuit may take any one of several forms but for purposes of illustration only, comprises a battery 132 and a switch 133. The positive terminal of the battery is connected to the node 110 and the negative terminal of the battery is connected to the node 112 for reasons more apparent hereinafter.

All tunnel diodes of the inverter exhibit the well known voltage-current characteristic of such diodes. The diodes of a set are selected to have voltage-current characteristics that are different with respect to peak and valley currents so as to produce the voltage-current characteristic shown in FIG. 7. Where the diodes of a set are matched, the resistors 102 and 104 are needed to produce the characteristic shown in FIG. 7. The voltage-current characteristic has positive resistance sections 116, 118, 122 and 126 connected together by negative resistance sections 120, 124 and 128. In the positive resistance section 116 both diodes of a set are in their low voltage, high current condition. For the positive resistance sections 118 and 122, however, the diodes are in opposite voltage current conditions. The single diode of a set is in the low voltage state whereas the resistor-diode combination is in the high voltage state when the diodes are operating on the positive resistance section 118. Conversely, the single diode of a set is in the high voltage state and the resistor-diode combination is in the low voltage state when the diodes are operating on the positive resistance section 122. Both diodes of a set are in the high voltage state when operating on the positive resistance section 126.

The voltage-current characteristic shown in FIG. 7, may be advantageously employed to obtain the desired inverter operation for the circuit of FIG. 6. By biasing each set of diodes along a load line 130 which crosses the positive resistance section 118 and 122, output signals can be obtained which are the inverse of positive or negative input signals supplied to the inverter. No output signal will be obtained when a ground signal is applied to the input circuit.

Assuming for purposes of the description that both sets of diodes are operating along the load line 130 and at an operating point A, then in accordance with the previous description, corresponding diodes 80 and 86 of each set will be in their low voltage state whereas corresponding diodes 82 and 84 will be in their high voltage state. The voltage across the diodes 82 and 84 are equal and opposite and hence no signal appears in the output circuit for a ground or no input signal. This is the normal condition of the circuit, the operation of the circuit being described next in conjunction with FIGS. 6 and 7 for positive and negative input signals.

Upon application of a positive pulse 140 to the input circuit, the diodes 80 and 82 change state, but the diodes 84 and 86 are unaffected by the pulse. The magnitude of the pulse $\Delta V$ increases the voltage across the diodes 80 and 82 sufficiently to switch the diodes to an operating point B indicated on the positive resistance section 122. For diodes 84 and 86, however, the pulse $\Delta V$ lowers the voltage across the diodes 84 and 86 but not enough to switch them from the positive resistance section 118. Hence, the diodes 80 and 82, as previously indicated, switch to the high voltage and low voltage condition, respectively, whereas the diodes 84 and 86 remain at the A operating point in the high voltage and low voltage condition, respectively. The polarities of the voltages across the diodes 82 and 84 are positive and negative, respectively, with respect to the reference point 103. Since the negative voltage is larger than the positive voltage by the diode 84 being in the high voltage state whereas the diode 82 is in the low voltage state, the output pulse with respect to ground is a negative pulse 142 which is the inverse of the input pulse 140.

The circuit is reset for the next operation by closing the switch 133 which reduces the voltage across the diode 80 and increases the voltage across the diode 82. As a consequence the diodes 80 and 82 return to the A operating point on the positive resistance section 118. The diodes 84 and 86 are not changed in setting by the reset pulse. The battery increases the voltage across the diode 84 which is in the high voltage condition and reduces the voltage across the diode 86 which is in the low voltage state. As a consequence the diodes 84 and 86 do not change state.

Upon the application of a negative pulse 144 to the input circuit, the diodes 84 and 86 switch from the A operating point to the B operating point, the voltage across the diode 84 decreasing and the voltage across the diode 86 increasing. The negative pulse 144 does not change the setting of the diodes 80 and 82 which are at the A operating point in the low voltage and high voltage condition respectively. As a consequence, the voltage across the diode 82 is positive and larger than the negative voltage across the diode 84 which is in the low voltage condition. Since the algebraic summation of the voltage is positive, a positive pulse 146, which is the inverse of the input signal 144, appears in the output circuit.

The circuit is reset for the next operation by closing the switch 133 which returns the diodes 84 and 86 to the A operating point. The diodes 84 and 86 return to the A operating for reasons similar to those described for the diodes 80 and 82 in returning to the A operating point from the B operating point.

It is believed apparent that the circuit of FIG. 6 may also be adapted for polarity reversal of a single input by eliminating one set of diodes and the input and output circuitry associated therewith. Such an inverter circuit is shown in FIG. 8 wherein corresponding elements to those shown in FIG. 6 have like reference designation.

It can be appreciated therefore, that the present invention has disclosed a circuit which may advantageously perform a number of different logical functions as well as provide polarity reversal of asynchronous signals. The unique arrangement of the bistable devices and the biasing thereof simplifies the circuitry for the complex logic operations required in asynchronously-operated apparatus. As a preferred embodiment the tunnel diode renders the circuits rapid in operation, simple to manufacture and low in cost.

Although unidirectional power sources have been indicated for biasing the bistable devices, it is believed apparent that alternating current supply will permit the same operation of the invention to occur as that previously described. It is also believed apparent that the present invention performs "AND" logic and "OR" logic and inverter operation for conventional binary signals, typically positive and negative signals as well as asynchronous signals. Hence, it is believed that the invention should not be limited to one type of input signal in the practice thereof.

While the invention has been particularly shown and described with reference to a preferred embodiment thereof, it will be understood by those skilled in the art that various changes in form and details may be made therein without departing from the spirit and scope of the invention.

What is claimed is:

1. A switching circuit comprising at least two bistable semiconductor devices connected in series relation, biasing means for normally maintaining the devices in the same voltage state and permitting selective switching of the bistable semiconductor devices in response to input signals, and input and output circuits connected across the series connected bistable semiconductor devices.

2. A switching circuit comprising at least two bistable semiconductor devices connected in aiding series relation and having a common junction which is connected to a reference point, means for forward biasing the bistable semiconductor devices and permitting selective switching of the devices in response to input signals, and input and output circuits connected across the series connected bistable semiconductor devices.

3. A logic circuit comprising at least two tunnel diodes connected in aiding series relation and having a common junction which is connected to a reference point, means for forward biasing the tunnel diodes and permitting selective switching of the diodes in response to binary signals, at least two input circuits connected across the series connected diodes, one diode switching in response to an input signal of one binary designation, the other diode switching in response to at least two signals of the other binary designation, and an output circut connected to the series diodes at opposite ends thereof.

4. A logic circuit comprising at least two bistable semiconductor devices connected in aiding series relation and having a common junction which is connected to a reference point, means for biasing the devices for selective operation in response to asynchronous signals, at least two input circuits connected across the series connected devices, each input circuit including an asymmetrical semiconductor diode and a resistor, one device switching in response to an input signal of one binary designation, the other diode switching in response to at least two signals of the other binary designation, and an output circuit connected across the series connected devices, said output circuit providing first, second and third signal levels in response to the signals appearing at the input circuit.

5. The logic circuit as defined in claim 4 wherein the diodes of each input circuit are connected in aiding series relation with said devices.

6. A logic circuit comprising at least two bistable semiconductor devices connected in aiding series relation and having a common junction which is connected to a reference point, means responsive to two or more asynchronous input signals to operate one of the devices upon the application of a single input pulse of preselected polarity and to operate the other device upon the application of a plurality of pulses of opposite polarity to the preselected polarity, and output circuit means connected across the series connected bistable devices to provide signals at a first, second or third level depending upon the combination of asynchronous signals supplied to the circuit, a first level output signal being provided only when two corresponding asynchronous input signals are received.

7. A logic circuit comprising first and second bistable semiconductor devices connected in aiding series relation and having a common junction which is connected to a reference point, means for forward biasing the devices and selectively operating the devices in response to asynchronous signals, at least two input circuits connected across the series connected devices, each input circuit including an asymmetrical semiconductor device and a resistor, said asymmetrical semiconductor devices being directly connected in aiding series relation with said first bistable device, said resistors being connected to the second bistable device, one bistable device switching in response to an input signal of one binary designation, the other bistable device switching in response to a pair of input signals of the other binary designation, and an output circuit connected across the series connected devices, said output circuit providing first, second and third signal levels in response to the signals appearing at the input circuit.

8. The logic circuit as defined in claim 7 wherein the asymmetrical devices are directly connected in aiding series relation with the second bistable device and the resistors are connected to the first bistable device.

9. A bipolar inverter circuit comprising at least two sets of bistable semiconductor devices connected in aiding series relation and having a common junction which is connected to a reference point, means for biasing the sets of devices to obtain operation of the devices in each set to a different stable condition, a balanced input circuit connected across both sets of series connected devices, and an output circuit connected to each set of series connected devices.

10. A logic circuit comprising a pair of bistable semiconductor devices connected in series aiding relation, means for biasing the bistable devices to be normally in substantially the same voltage state but operating at different switching thresholds, a plurality of input circuits connected across the series connected bistable devices and adapted to receive first, second and third input signal levels, and an output circuit connected across the series connected bistable devices so that in response to the input signal levels at least one device will be switched to a different voltage state and an output signal will appear which is the algebraic summation of the voltages across the devices whereby at least two input signals at the first level will generate the corresponding output signal level whereas any other combination of input signal levels will provide an output signal at different levels.

11. A logic circuit comprising a pair of bistable semiconductor devices connected in series aiding relation, a reference potential connected to the common terminal between the devices, means for biasing the bistable devices to be normally in substantially the same voltage state but operating at different switching thresholds, an input circuit having two branches, one branch being connected to one end of the series connected bistable devices and the second branch being connected to the other end of the series connected bistable devices, at least one branch including a nonlinear impedance element, and an output circuit having two branches, the branches being connected to the bistable devices so that in response to input signals an output signal is developed which is the algebraic summation of the voltages across the bistable device.

12. A logic circuit comprising:

(a) a plurality of bistable semiconductor devices connected in series and having a first terminal at one end and a second terminal at the other end;

(b) a biasing voltage of one polarity and load element connected to the first terminal;

(c) a biasing voltage of the other polarity and a load element connected to the second terminal;

(d) a reference potential connected to the midpoint of the series connected bistable devices;

(e) a plurality of input circuits each having first and second branches, one branch of each input circuit connected to the first terminal, a second branch of each input circuit connected to the second terminal;

(f) an output circuit including a plurality of branches, a first branch including an impedance element connected to the first terminal and a second branch including an impedance element connected to the second terminal.

References Cited by the Examiner

UNITED STATES PATENTS

| | | | |
|---|---|---|---|
| 3,027,464 | 3/1962 | Kosonocky | 307—88.5 |
| 3,078,376 | 2/1963 | Lewin | 307—88.5 |

OTHER REFERENCES

Electronics: August 1959, page 61, "Tunnel Diode: Big Impact?"

Electronics: June 1960, pages 103 to 107, "Tunnel Diode Logic Circuits" (Chow).

JOHN W. HUCKERT, *Primary Examiner.*

GEORGE N. WESTBY, ARTHUR GAUSS, *Examiners.*

R. LAKE, E. DREYFUS, R. SANDLER, *Assistant Examiners.*

UNITED STATES PATENT OFFICE

CERTIFICATE OF CORRECTION

Patent No. 3,265,903 August 9, 1966

Algirdas J. Gruodis

It is hereby certified that error appears in the above numbered patent requiring correction and that the said Letters Patent should read as corrected below.

In the heading to the sheet of drawings, line 1, for "A. J. GROUDIS" read -- A. J. GRUODIS --.

Signed and sealed this 22nd day of August 1967.

(SEAL)
Attest:

ERNEST W. SWIDER
Attesting Officer

EDWARD J. BRENNER
Commissioner of Patents